May 2, 1933. L. A. BODE 1,906,520
BRAKE COOLING MECHANISM
Filed June 24, 1931
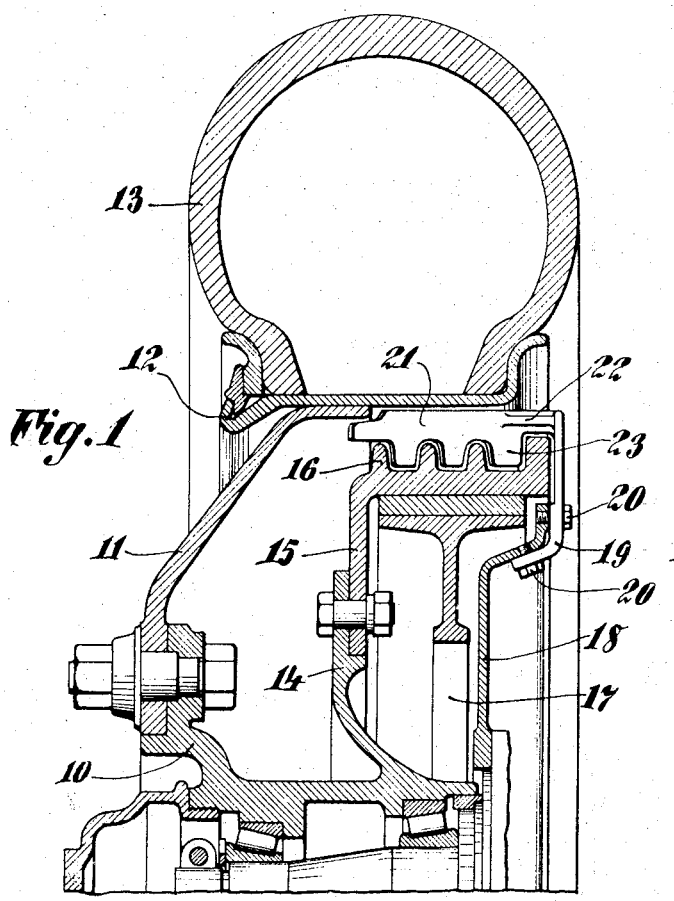
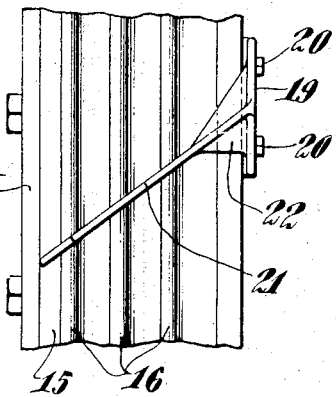
Fig. 2
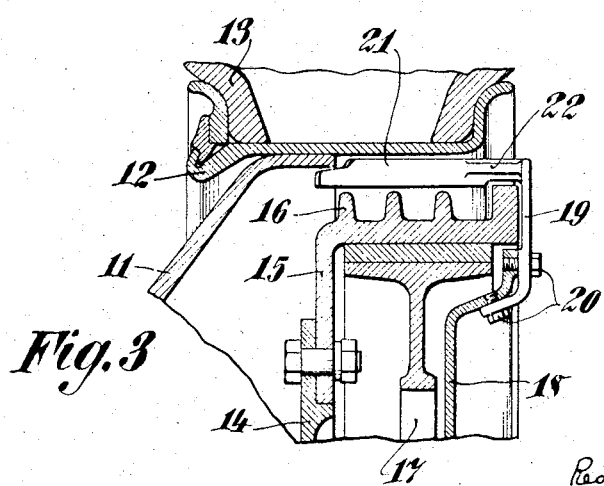
Fig. 3
INVENTOR
Louis A. Bode,
BY
Redding, Greeley, O'Shea + Campbell
HIS ATTORNEYS Patented May 2, 1933

1,906,520

UNITED STATES PATENT OFFICE

LOUIS A. BODE, OF NORTH PELHAM, NEW YORK, ASSIGNOR TO INTERNATIONAL MOTOR COMPANY, OF NEW YORK, N. Y., A CORPORATION OF DELAWARE

BRAKE COOLING MECHANISM

Application filed June 24, 1931. Serial No. 546,446.

The present invention relates to brake mechanisms and embodies, more specifically, an improved brake mechanism, wherein a cooling device is embodied to improve the operation thereof.

It is a matter of common knowledge that the air surrounding the brake drum in certain forms of wheels stagnates and the circulation thereof is poor, thus reducing the cooling effect upon the brake drum which might otherwise be obtained with a circulation of air about the surface of the same. An object of the present invention, accordingly, is to provide a brake construction, wherein a device is embodied for promoting the air circulation about the drum and thus improving the cooling thereof during operation.

A further object of the invention is to provide a device for improving the air circulation about a brake drum such device being readily applied to a relatively stationary part of the brake mechanism whereby agitation of the air about the brake drum is effected.

The attainment of the foregoing objects is had by the provision of one or more fingers or blades which are secured to the brake spider or other stationary portion of the brake mechanism, such blades projecting over the drum and extending into the path of active air whereby the same is deflected and directed over the drum to agitate the air in contact therewith.

Further objects, not specifically enumerated above, will be apparent as the invention is described in greater detail in connection with the accompanying drawing, wherein:

Figure 1 is a view in section taken through a wheel and brake mechanism provided with a deflecting or cooling device constructed in accordance with the present invention.

Figure 2 is a plan view of the brake drum and cooling device shown in Figure 1.

Figure 3 is a view similar to Figure 1, showing an improved form of the invention.

Referring to the above drawing, the hub of a wheel is shown at 10 and carries a wheel spider 11 upon which a rim 12 and tire 13 are mounted. A flange 14, formed on the wheel hub carries a brake drum 15 which is preferably formed with circumferential ridges 16 to permit the cooling thereof.

Within the brake drum, brake shoes 17 are mounted, the specific mounting of these shoes and operating mechanism therefor forming no part of the present invention. A brake spider 18 is mounted upon a relatively stationary portion of the vehicle and may mount the brake shoes and operating mechanism in any well known fashion in accordance with standard practice.

Upon the outer periphery of the spider 18, one or more brackets 19 are secured, as by bolts 20. The brackets 19 extend upwardly past the open side of the brake drum and have formed integrally therewith a blade or finger 21 which projects over the cylindrical surface of the drum 15. Reinforcing and strengthening webs 22 may be provided and the plane of the blade 21 is preferably at an angle to the axis of the brake drum as shown in Figure 2. Downwardly depending portions 23 are provided to lie between the rib 16 and thus effect complete agitation of the air therebetween.

It will thus be seen that as the vehicle moves, air will be deflected by the blade 21 and directed over the surface of the brake drum, the movement of the air in proximity to such drum being quite active and promoted by the deflecting blade. Not only will fresh and cool air be directed over the surface of the drum, but the deflector or blade will also serve to direct the heated air outwardly and thus promote efficient circulation of the air about the drum.

In the construction shown in Figure 3, the blade 21 is provided with an even lower edge and is adapted to deflect the air circulating about the drum and above the ridges 16.

While the invention has been described with specific reference to the accompanying drawing, it is not to be limited, save as defined in the appended claims.

I claim as my invention:

1. In combination with a brake drum and a relatively stationary brake element, a bracket mounted on the stationary element, and a deflector blade on the bracket and projecting over the drum to promote circulation of air about the brake drum.

2. In combination with a brake drum and a relatively stationary brake element, a bracket mounted on the stationary element, and a deflector blade on the bracket and projecting over the drum at an angle to the axis thereof to promote circulation of air about the brake drum.

3. In combination with a brake drum having an external cylindrical portion and a relatively stationary brake element, a bracket mounted on the stationary element, a deflector blade on the bracket projecting over the cylindrical portion of the drum and at an angle to the axis thereof to promote circulation of air about the brake drum.

4. In combination with a brake drum having an external cylindrical portion formed with circumferential ribs and a relatively stationary brake element, a bracket mounted on the stationary element, a deflector blade on the bracket projecting over the cylindrical portion of the drum and at an angle to the axis thereof and formed with fingers to lie between the circumferential ribs on the drum to promote circulation of air about the brake drum.

This specification signed this 22nd day of June A. D. 1931.

LOUIS A. BODE.